United States Patent
Jackson

[15] 3,684,142
[45] Aug. 15, 1972

[54] ADJUSTABLE BEATER BAR

[72] Inventor: David B. Jackson, Loveland, Ohio

[73] Assignee: Hercules Incorporated, Wilmington, Del.

[22] Filed: Aug. 3, 1970

[21] Appl. No.: 60,681

[52] U.S. Cl. ....................225/97, 83/660, 83/678, 83/700
[51] Int. Cl. ...............................................B26f 1/20
[58] Field of Search ..225/97; 83/678, 660, 596, 674, 83/700, 300

[56] References Cited

UNITED STATES PATENTS

| 3,086,416 | 4/1963 | Minarik | 83/678 X |
| 759,071 | 5/1904 | Brooks | 83/678 X |
| 2,067,456 | 1/1937 | Meisel | 83/700 X |
| 2,257,336 | 9/1941 | Feurt | 83/674 X |
| 3,565,308 | 2/1971 | Slack | 225/97 |

Primary Examiner—Frank T. Yost
Agent—John W. Whitson

[57] ABSTRACT

A rotatable beater bar, used for fibrillating film, comprises serrated edges mounted thereon in such a manner that the edges can be removed therefrom or adjusted according to the type of fibrillation desired.

1 Claim, 6 Drawing Figures

PATENTED AUG 15 1972 3,684,142
SHEET 1 OF 2

DAVID B. JACKSON
INVENTOR

BY *Sheldon L. Rayes*
ATTORNEY

DAVID B. JACKSON
INVENTOR

BY Sheldon F. Raizes
ATTORNEY

ADJUSTABLE BEATER BAR

This invention is an improvement on the type of beater bar 4 disclosed in U.S. Pat. Nos. 3,494,522 and 3,495,752. The beater bar disclosed in these patents is a solid member having serrated edges. A particular beater bar of this type is only good for a certain set of conditions since the serrations are turned in helical form on rod stock and then the rod is cut to form a plurality of circumferentially spaced serrated edges 5. Therefore, conditions which require any change in (1) the number of edges on the beater bar, (2) in the number of teeth in any edge, or (3) in the helical path of the teeth, necessitates the creation of an entirely new beater bar.

It is an object of this invention to provide a beater bar which has serrated edges which can be adjusted relative to each other and changed in accordance with desired conditions.

Other objects of the invention will become apparent from the following description and drawing wherein.

Figure 1:
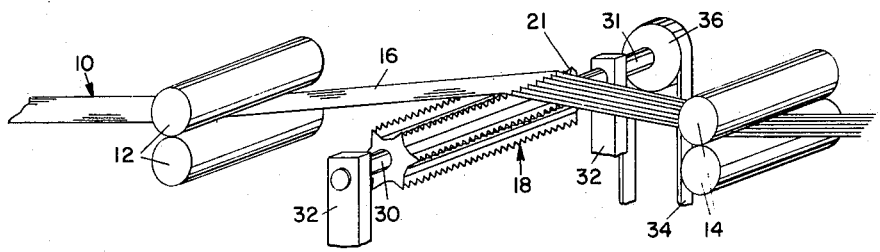
FIG. 1 is a schematic view of a fibrillating system embodying the present invention.
Figure 2:
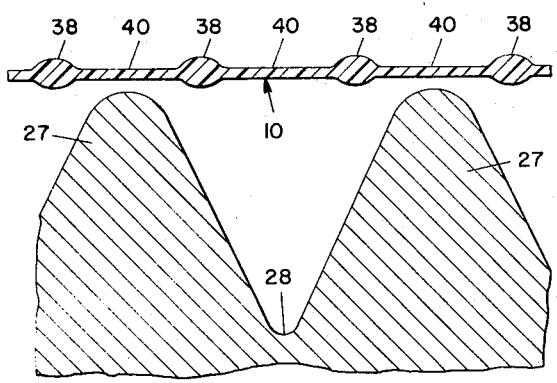
FIG. 2 is a partial view in section of a serrated edge and striated film.
Figure 3:
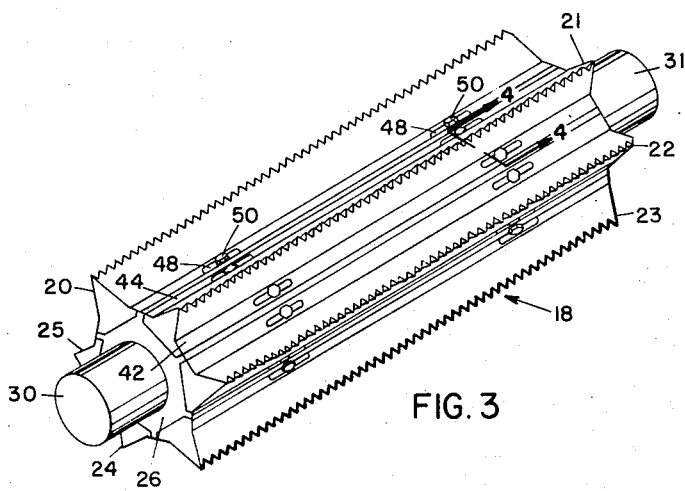
FIG. 3 is an enlarged view of the beater bar shown in FIG. 1.

Referring to FIGS. 1-3, a striated ribbon 10 is fed between a pair of feed rolls 12 and a pair of draw rolls 14. The space between the feed rolls 12 and draw rolls 14 defines a fibrillation zone and the rolls 12 and 14 are driven at relative speeds to maintain the section 16 of ribbon 10 in the fibrillation zone under tension. The tensioned section 16 of the film is engaged by a beater bar 18 which comprises six serrated edges 20, 21, 22, 23, 24, and 25 removably and adjustably secured to a base member 26 at equally spaced circumferential positions. Each serrated edge comprises teeth 27 and valleys 28 separating the teeth an equal distance from each other and positioned on successive edges to form a fixed helix angle around the bar. The beater bar 18 is journaled for rotation about its axis by means of a pair of trunnions 30, 31, extending from each end thereof, which extend into a pair of spaced supports 32 located at each end of the beater bar 18. Rotation of the beater bar 18 is imparted by any well known means as, for example, by a belt 34 entrained about a pulley 36 secured to the trunnion 31. The beater bar is arranged so that its rotational axis is parallel to the pinch lines of the feed and draw rolls and the edges 20, 21, 22, 23, 24, and 25 thereof engage the film on a line which is outside of a plane passing through the pinch lines whereby upon rotation of the beater bar and upon engagement of the edges with the film, the film will be fibrillated.

The film 10 comprises a thin strip of thermoplastic material such as polypropylene, and, as illustrated in FIG. 2 is striated, or in other words, is provided with a series of substantially uniformly spaced parallel ribs 38 or striations running longitudinally thereof and interconnected by webs 40 of reduced thickness. The film 10 is unaxially oriented in the direction parallel to the striations whereby the film is much stronger in a longitudinal direction than in a transverse direction of the film. In fact the transverse strength of each web is usually such that very little transverse force is required to tear or break the web and separate the striations.

The teeth 26 are rounded at the tip thereof and taper outwardly towards the valley. Fibrillation occurs when the teeth engage a web and due to the tension of the film portion 16, the striations or ribs 38 are forced down against a tooth creating a wedging action forcing the striations 38 apart.

As pointed out in U.S. Pat. Nos. 3,494,522 and 3,495,752, the type of pattern of fibrillation will depend upon the speed of rotation of the beater bar, the speed of the film, the angle of the helix path described by the teeth, the spacing of the teeth, the spacing of the striations and the strength of the webs.

A beater bar edge is made by placing threads on a bar stock in a helical pattern and then segments of the bar are cut away to form a bar with serrated edges. Obviously, if the angle of the helical path described by the teeth must be changed in accordance with desired fibrillation properties, an entirely new bar must be threaded and cut.

Figure 4:
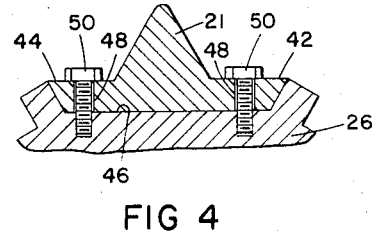
FIG. 4 is a view taken along section line 4—4 of FIG. 3.

Referring to FIGS. 3 and 4, each serrated edge is removably secured to the bar. The serrated edges are made in the same manner as described above and are then cut from the bar, on which it was formed, as a segment. Each serrated edge is provided with a pair of flanges 42, 44 extending laterally on each side thereof and which slidingly fit in grooves 46 of the beater bar base member 26. A plurality of axially extending slots 48 are provided in each flange and bolts 50 pass through the slots and secure the edge member to the beater bar base member 26. The provision of slots allows axial adjustment of each edge member relative to the beater bar base member 26 to provide a desired helical pattern of teeth depending upon the number of striations per inch of film and the type of fibrillation desired.

Figure 5:
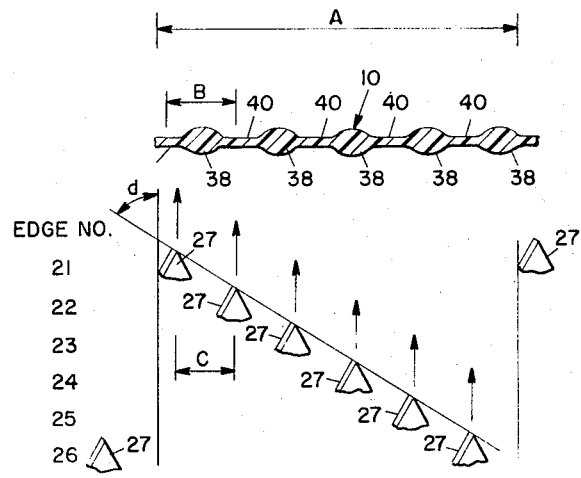
FIG. 5 is a view showing undesired positions of teeth on successive edges relative to the striations of the film.

Referring to FIG. 5, an undesirable relationship between the striated film 10 and the location of teeth 26 on a beater bar is shown even though the location of the teeth on the beater bar is perfect for film having striations spaced closer together. In particular, assume that the six edge beater bar 18 is utilized with each edge having 40 teeth per inch or one tooth every 0.025 inch. The spacing between the teeth is designated as A. The striated film 10 has 200 striations 38 per inch or one striation every 0.005 inch. The spacing between each striation is designated as B. The helix angle $d$ is such that the transverse spacing between a tooth on one edge to a tooth on the same helical path on the next successive edge is 0.0038 inch. This spacing is designated as C. As can be seen, the spacing C of the teeth 27 is such that a substantial number of teeth will strike the ribs 38 which is very undesirable as this will tend to damage the ribs.

Figure 6:
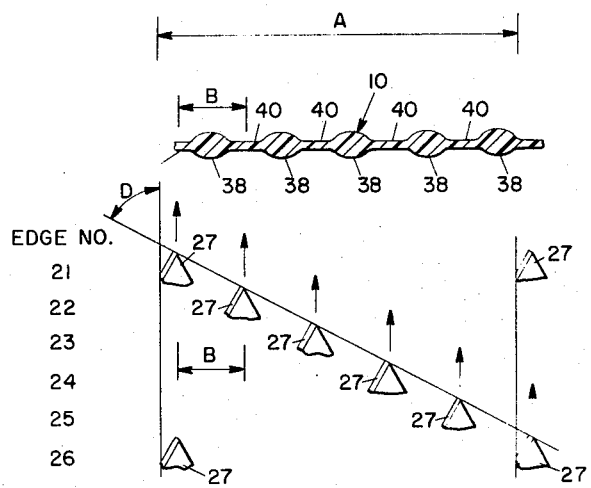
FIG. 6 is a view similar to FIG. 5 only showing the edges shifted to desirable positions relative to the film striations.

Referring to FIG. 6, the relationship between the teeth 26 and striations 38 is corrected by moving each of the edge members 20, 21, 22, 23, 24, and 25 axially to a position increasing the helix angle to D so that the teeth will strike the webs 40 rather than the ribs 38. The position of the cutting edges is such that the transverse distance between the tooth on one edge and the tooth in the same helical path on the next successive edge is the same as the striation spacing B or 0.005 inches. In this position each tooth will strike a corresponding aligned web. Any number of edges can be employed depending on the diameter of the beater bar.

The beater bar construction described can be utilized for fibrillating nonstriated film. The only change would be that the serrated teeth would have sharp tips rather than rounded tips. Furthermore, any number of edges may be used and the teeth, instead of being positioned on a helical path, may be pitched in parallel alignment circumferentially at right angles to the axis of the bar.

In view of the above, it can be seen that by utilizing a beater bar with adjustable serrated edges, fibrillating efficiency is increased and striking of ribs or striations by the fibrillating teeth is minimized without having to change to a different beater bar when conditions are changed.

What I claim and desire to protect by Letters Patent is:

1. A rotatable beater bar for a fibrillating film system, said bar comprising: an elongated base member, a plurality of elongated serrated edge members, means for releasably and adjustably securing each of said edge members to said elongated base member at circumferentially equally spaced positions, each of said edge members extending in an axial direction of said bar and being disposed generally parallel to the axis of said bar, the serrations on each of said elongated edge members being a plurality of spaced teeth integral with its respective said edge member and projecting from said base member in a direction generally radial to the axis of said base member, each of said teeth having a rounded tip, each of said edge members being of the same geometrical configuration, said means for releasably and adjustably securing each of said edge members comprising at least one slot in a respective edge member and a bolt extending through said slot fixedly securing said edge member to said base member.

* * * * *